United States Patent
Boche

(10) Patent No.: US 6,491,325 B1
(45) Date of Patent: Dec. 10, 2002

(54) CRIMPED SWIVEL FITTING AND METHOD OF ATTACHMENT OF THE FITTING TO A HOSE

(75) Inventor: Craig Steven Boche, Norfolk, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/601,834

(22) PCT Filed: Apr. 24, 1998

(86) PCT No.: PCT/US98/08301

§ 371 (c)(1),
(2), (4) Date: Aug. 4, 2000

(87) PCT Pub. No.: WO99/56050

PCT Pub. Date: Nov. 4, 1999

(51) Int. Cl.[7] ............................................. F16L 33/00
(52) U.S. Cl. ...................................... 285/256; 285/259
(58) Field of Search ........................... 285/148.16, 256, 285/259

(56) References Cited

U.S. PATENT DOCUMENTS

| | | | | |
|---|---|---|---|---|
| 2,430,921 A | * | 11/1947 | Edelmann | 285/256 |
| 2,570,477 A | * | 10/1951 | Paquin | 285/256 X |
| 3,245,699 A | * | 4/1966 | Peterman | 285/256 X |
| 3,549,180 A | * | 12/1970 | MacWilliam | 285/256 |
| 3,711,131 A | * | 1/1973 | Evans | 285/256 |
| 3,791,680 A | * | 2/1974 | Cleare | 285/259 X |
| 4,288,110 A | * | 9/1981 | Grenell | 285/259 X |
| 4,671,542 A | | 6/1987 | Juchnowski | 285/174 |
| 5,105,854 A | | 4/1992 | Cole | 138/109 |
| 5,267,758 A | * | 12/1993 | Shah et al. | 285/256 |
| 5,317,799 A | * | 6/1994 | Chapman et al. | 285/256 X |
| 5,398,977 A | | 3/1995 | Berger et al. | 285/133.1 |
| 5,417,461 A | * | 5/1995 | Dougherty et al. | 285/256 |
| 5,788,292 A | * | 8/1998 | Korner et al. | 285/256 X |

FOREIGN PATENT DOCUMENTS

GB 2 274 696 8/1994 .......... F16L/33/207

* cited by examiner

Primary Examiner—Lynne H. Browne
Assistant Examiner—David E. Bochna
(74) Attorney, Agent, or Firm—Nancy T. Krawczyk

(57) ABSTRACT

An improved crimped swivel fitting (10) for a gasoline hose (11) is disclosed. The fitting is a three-piece assembly (10). A male stem (30) is provided with a shoulder (39) at one external end (31A) and a series of barbs (35) at the opposing end (31B). A swivel nut (50) with an external threading, is slid over the stem barbs (35) and abuts directly against the shoulder (39). The barbed stem end (31B) is inserted into a hose (11) to which a ferrule (60) with internal notching (64) has already been attached. An internal shoulder (63) of the ferrule (60) rests in a groove (33) on the stem (30) and directly abuts against a shoulder (55) of the swivel nut (50). The ferrule (60) is crimped onto the stem (30), thereby securing the fitting to the hose, and locking the swivel nut (50) onto the assembly (10).

10 Claims, 4 Drawing Sheets

CRIMPED SWIVEL FITTING AND METHOD OF ATTACHMENT OF THE FITTING TO A HOSE

FIELD AND BACKGROUND OF THE INVENTION

This invention relates to a swivel fitting for a hose, preferably for a gasoline hose. More particularly, the invention relates to a swivel fitting permanently affixed to a hose.

Hose fittings, and in particular, swivel fittings, are known and have been in use for many years. Such fittings are attached to the end of a hose for the further conduit of a liquid or gas. Conventional swivel fittings used on gasoline hoses are reattachable, permitting the removal of the gasoline nozzle or hose and reinstallation and attachment of different swivel nuts and various attachments in the field by any technician or layperson.

Prior art swivel fittings function with a swivel nut secured to a stem piece by means of a retaining ring. The partial assembled fitting, with the retaining ring and swivel nut at the opposing end, is inserted into a hose, over which a ferrule has already been provided. The ferrule is secured to the stem, connecting the hose with the swivel fitting. By design, the conventional retaining ring is removable and the swivel nut can be removed and reinstalled in the field which may lead to safety concerns if the fitting is not reinstalled correctly. In practice, the retaining ring frequently becomes damaged and can come off while in service, resulting in a serious safety problem.

U.S. Pat. No. 4,804,212 discloses a three piece swivel fitting consisting of a nipple to be inserted into the end of a length of hose and secured to the hose by a socket crimped around the end of the nipple and hose. The swivel nut, with internal threading to provide direct metal to metal contact with the nipple for purposes of fluid transfer, is inserted onto the opposing end of the nipple prior to insertion into the hose and crimping. The disclosed fitting is crimped onto the hose assembly in such a manner as to form required wrench flats on the socket, in correspondence to the wrench flats on the swivel nut. The wrench flats on both the socket and swivel nut enable the operator to replace fittings without twisting the hose by providing a means of retaining the opposing ends by wrenches.

SUMMARY OF THE INVENTION

The disclosed invention is an externally crimped gasoline hose swivel fitting and a method of providing a crimped-on swivel fitting for a hose. The fitting is a three piece assembly. The first piece is a stem with a shoulder at one external end and a series of hose barbs at the opposing end. A swivel nut is slid over the hose barbs of the stem and retained on the stem by means of the shoulder. The barbed end of the stem is inserted into a hose to which a ferrule with internal notches has already been attached. An internal shoulder on the ferrule rests in a groove on the stem and the ferrule is crimped onto the stem, thereby securing the fitting to the hose.

The swivel nut is retained on the stem by means of the stem shoulder and the crimped ferrule. The swivel nut is provided with external threads permitting attachment of a female fitting gasoline nozzle. The swivel nut on the hose fitting freely rotates 360° about the stem, allowing any attached nozzle or further hose attachment to rotate freely around the hose.

The ferrule has a smooth outer circumferential exterior. At one axial end of the ferrule is a radially inwardly extending shoulder, of a dimension to rest in a groove on the stem. Axially inward of the shoulder is a series of internal notches. The internal notching engages the hose and the barbs of the stem to secure the hose during crimping.

Advantages of the invention are cost reductions for the fitting, reduced safety problems associated with known swivel fittings, and improved pullout force of the fitting.

BRIEF DESCRIPTION OF THE DRAWINGS

The invention will be better understood from the following detailed description taken in conjunction with the accompanying figures of the drawings wherein:

FIGS. 2A and 2B illustrate the stem of the disclosed invention, wherein FIG. 2A illustrates the external construction and FIG. 2B illustrates the internal construction.

DETAILED DESCRIPTION OF THE DRAWINGS

Figure 1:
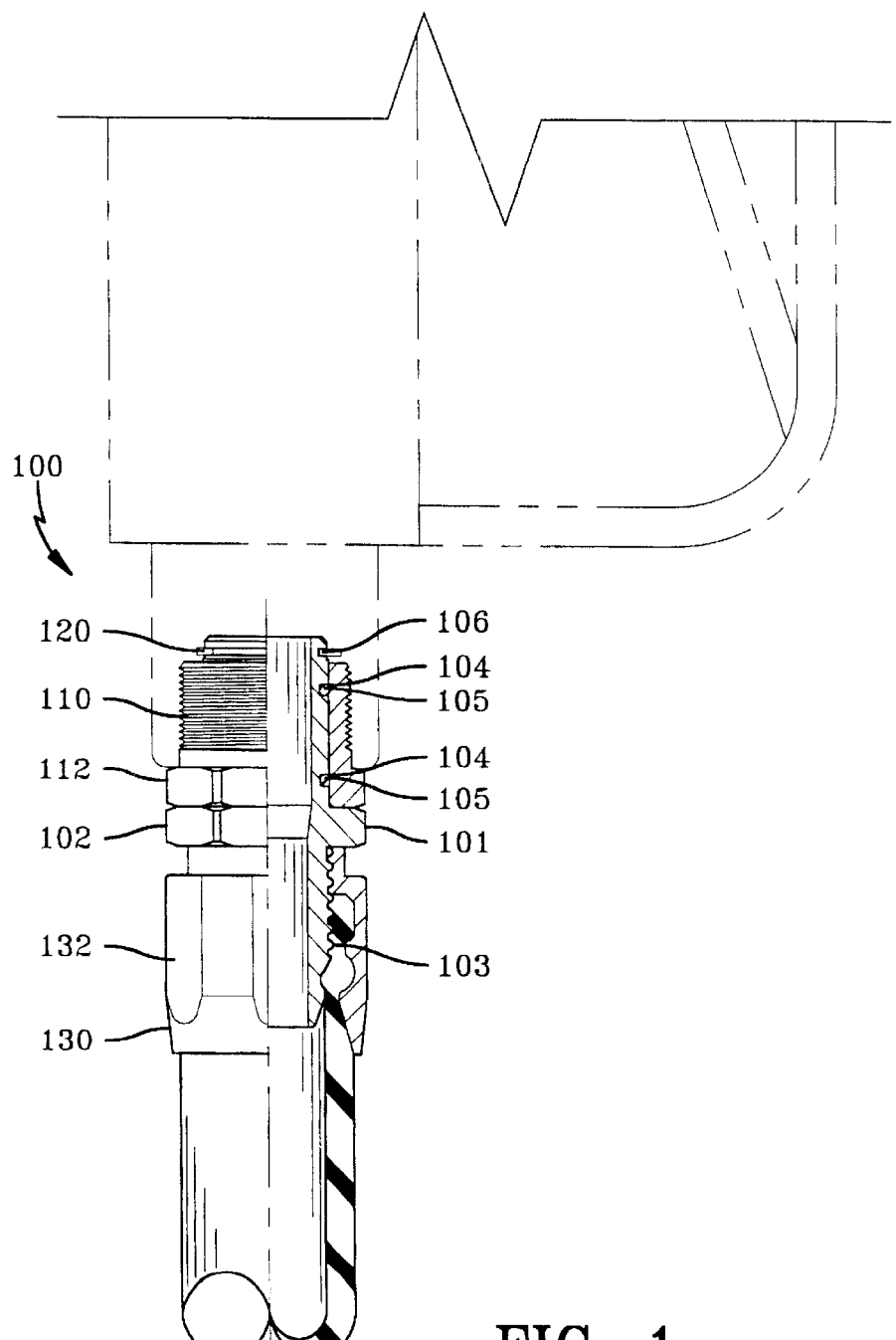
FIG. 1 illustrates a conventional four-piece swivel fitting attached to a hose.

FIG. 1 shows a conventional four-piece swivel fitting 100 for use with a gasoline hose and nozzle. The stem 101 has a dual male configuration with a set of wrench flats 102 formed midway between the opposing ends. One axial end is provided with a series of ridges 103 for engagement with a hose. The opposing end is provided with a series of grooves 104 for placement of o-rings 105 to provide a gasoline impervious seal with the swivel nut 110. The swivel nut 110 is slid onto the stem 101 with the wrench flats 112 of the swivel nut 110 abutting the wrench flats 102 of the stem 101. The retaining ring 120 is then attached to the outermost groove 106 of the stem 101, securing the swivel nut 110 to the stem 101. The stem 101 is then inserted into a hose which already is provided with a ferrule 130. The outer circumference of the ferrule 130 has wrench flats 132. The end of the ferrule 130 is abutted against the wrench flats 102 of the stem 101 and secured to the stem 101. While in use, the retaining ring 120 can be disengaged and the swivel nut 110 removed and replaced, as well as reinstalled.

Figure 2A:
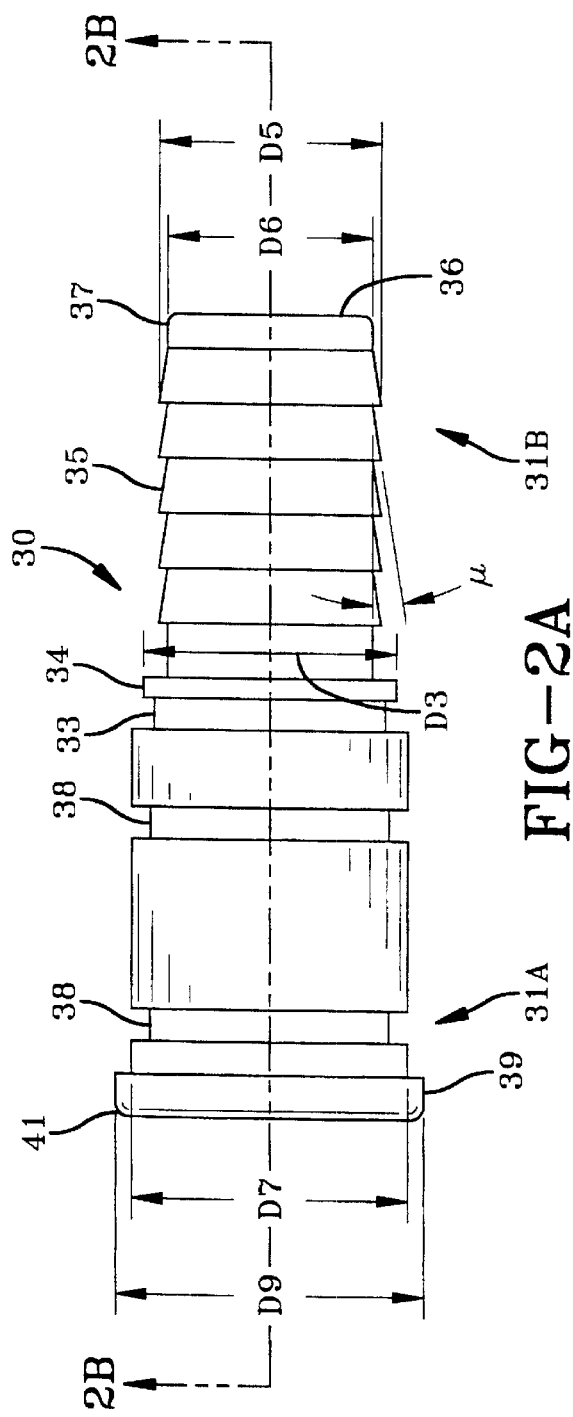
Figure 2B:
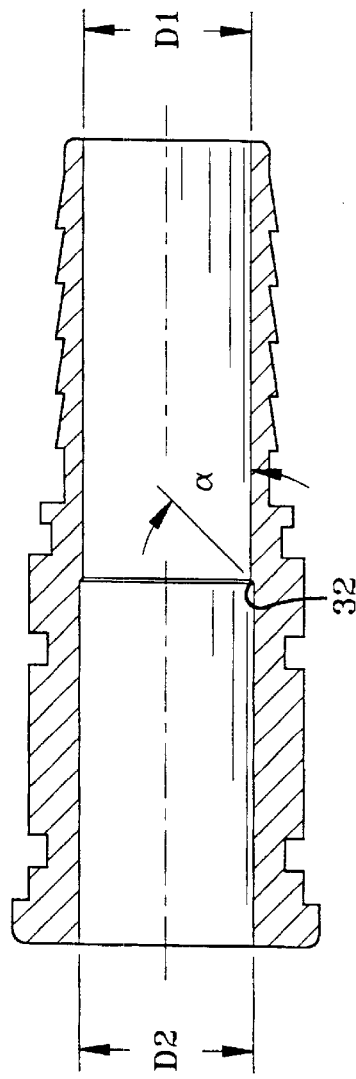

FIG. 2B illustrates the internal structure of the stem 30 of the disclosed invention in greater detail. The stem 30 is a tubular unit with a smooth stepped diameter internal configuration. The internal boring of the stem 30 is comprised of two diameters. The first diameter D1 is 80 to 115% of the second diameter D2 of the inner bore. The two diameters are connected by an angled tapering 32 of the bore. The angle, α, relative to the axial centerline of the stem, is within the range of 15° to 50°. To one of ordinary skill in the art, it is recognized that the angle α is a function of the difference in the bore diameters and the length of the connecting taper 32. In the preferred embodiment of the disclosed invention, the angle α is 45°.

As seen in FIG. 2A, the outer circumference of the stem 30, is comprised of a groove 33 and shoulder 34. The shoulder 34 is of a diameter D3 less than the diameter D4 of the internal shoulder 63 on the inventive ferrule 60, so that the ferrule shoulder 63 passes over shoulder 34 and sets in the groove 33. The width of the groove 33 is greater than the axial width of the internal ferrule shoulder 63.

Alternatively, the stem 30, radially outward of the interior connecting taper 32, may be defined by a series of shoulders and grooves to provide for differing length stems. In such an alternative, the ferrule shoulder, as previously discussed, rests in the intermost groove of the stem.

Axially spaced from the shoulder 34 is a series of slanted barbs 35 for engagement with the hose 11. The barbs 35 at the radially outermost point have a diameter D5 equal or less than the diameter D3 of the adjacent shoulder 34. In the preferred embodiment, the barbs 35 have a greatest diameter D5 equivalent to the diameter D3 of the shoulder 34. The barbs 35 each have an axially outer sloped wall inclined, relative to the axial direction of the stem 30, at an angle $\mu$ of 5° to 15°. The stem 30 is provided with preferably three to seven barbs 35, the number of barbs 35 dependant upon the stem length. In the preferred embodiment, the stem 30 has five barbs 35. The structure of each barb 35 is such that as the ferrule 60 is slid over the end of the stem 30, with the hose 11 therebetween the ferrule 60 and the stem 30, the barbs 35 engage the ferrule shoulder 63. As force is applied to the ferrule 60 to move the ferrule 60 axially inward toward the groove 33, the barbs 35 grip the hose 11 between the ferrule 60 and the stem 30.

The axially outermost right hand end 36 of the stem 30 has a diameter, D6, less than the ferrule shoulder diameter D4. The stem edge 37 may be chamfered to aid in insertion of the stem 30 into the hose 11, Chamfering the stem edges 37 reduces internally cutting of the hose 11 when the assembly 10 is prepared. The chamfered edge 37 has a radius of about 0.03 inches with a center of curvature inside the stem 30.

The left-hand side of the stem 31A is defined by a series of grooves 38 and an axially outermost shoulder end 39. The diameter D7 of the left-hand portion of the stem 30 is less than the inner diameter D8 of the swivel nut 50. The grooves 38 in the stem are for the placement of gasoline impervious o-rings 40. The two o-rings 40 may be of identical properties or may differ depending upon the desired fluid to be conveyed. The diameter D9 of the axially outermost shoulder end 39 is greater than the inner diameter D8 of the swivel nut 50.

Similar to the left-hand edge of the stem 37, the right hand edge of the stem 41 may be chamfered. In the preferred embodiment, the chamfered edge 41 has a radius of about 0.04 inches with a center of curvature inside the stem 30.

Figure 3:
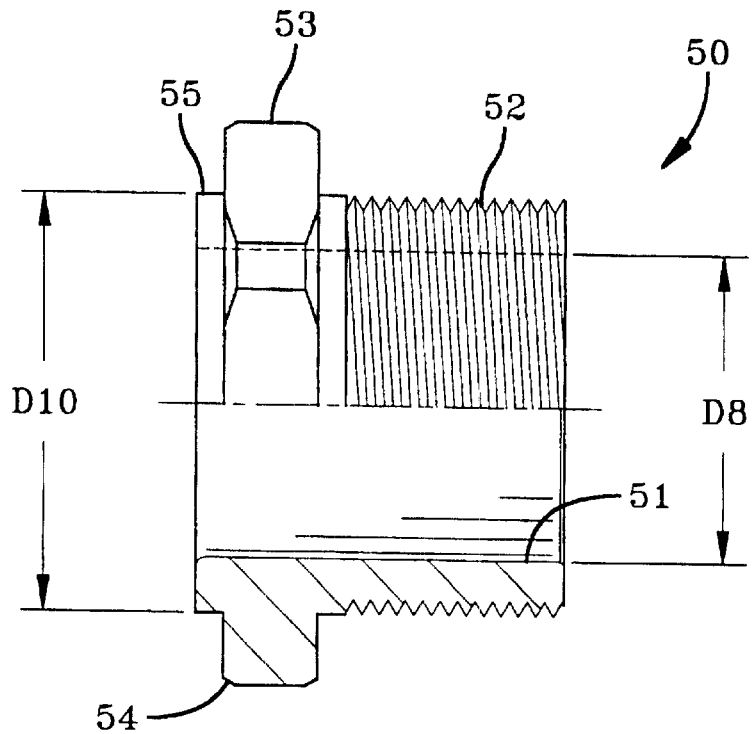
FIG. 3 illustrates the swivel nut of the disclosed invention.

FIG. 3 illustrates the tubular swivel nut 50 in greater detail. The internal bore 51 of the swivel nut 50 is a smooth circumference. As apparent from FIG. 2, for engagement with the stem 30, the internal diameter D8 of the nut 50 is less than the external diameter D9 of the axially outermost shoulder end 39 of the stem 30, such that the swivel nut 50 is retained onto the stem 30 by sliding the swivel nut 50 over the right hand side of the stem 31B. One axial end of the swivel nut 50 is provided with external conventional threading 52. The external threading 52 is for direct engagement with a gasoline nozzle or other conventional female threaded conduit. Wrench flats 53 are disposed at the opposing end of the swivel nut 50, and in the final assembly of the swivel fitting 10, provide the only set of wrench flats. In the preferred embodiment, the axially outer edges of the wrench flats 54 may be beveled at angles of about 20° relative to a radial line of the swivel nut 50. Axially outward of the wrench flats 53 is a shoulder 55 with a diameter D10 greater than the internal ferrule shoulder diameter D4.

Figure 4:
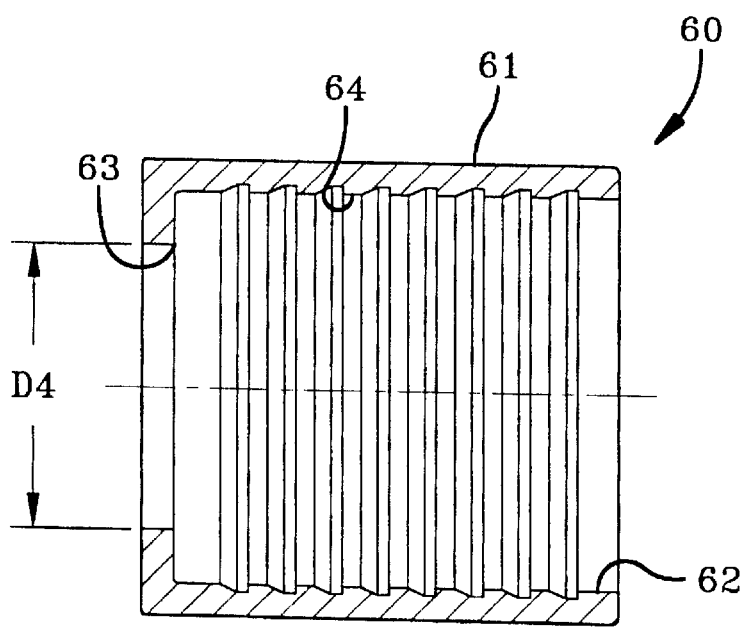
FIG. 4 illustrates the ferrule of the disclosed invention.

FIG. 4 illustrates the tubular ferrule, 60, in greater detail. The outer circumference of the ferrule 61 is a substantially circular circumference. The inner bore 62 of the ferrule is defined by a shoulder 63 and a series of notches 64. The diameter D4 of the internal shoulder 63 is greater than the external diameter D3 of groove 33 of the stem 30, with which the ferrule 60, is ultimately in engagement following crimping of the assembly 10.

The notches 64 extend the length of the ferrule 60. The ferrule 60 is provided with preferably 5 to 10 notches, the number of notches 64 is dependent upon the ferrule length. In the preferred embodiment, the ferrule 60 has eight notches 64.

Figure 5:
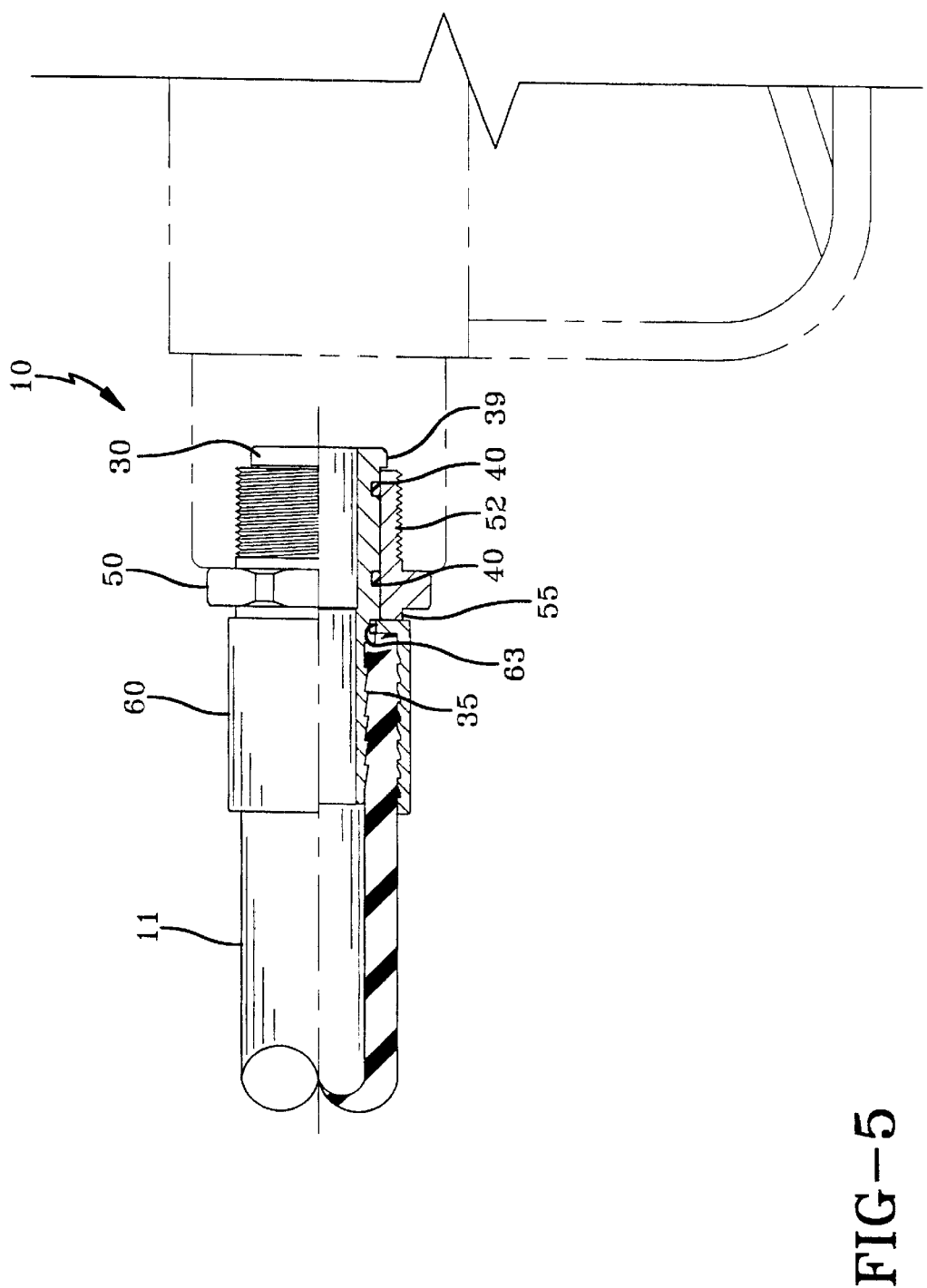
FIG. 5 illustrates a crimped on swivel fitting according to the invention, mounted to a hose and gasoline nozzle.

In providing a hose 11 with a crimped on swivel fitting 10 in accordance with the disclosed invention, the following steps are employed, see also FIG. 5. The swivel nut 50 is slid over the barbed end of the stem 31B, with the threads 52 directed towards the axially outermost shoulder 39 of the stem 30. The swivel nut 50 is pushed over the o-rings 40 until the swivel nut directly abuts against the stem shoulder 39. The ferrule 60 is placed over the end of the hose 11 with the internal shoulder 63 directed toward the terminal end of the hose. The barbed end of the stem 31B, with the attached swivel nut 50 at the opposing stem end 31A, is then inserted into the hose 11. After placement of the stem 30 into the hose 11, the internal ferrule shoulder 63 is positioned within the groove 33 of the stem 30, and the outer wall of the ferrule shoulder 63 directly abuts the shoulder 55 of the swivel nut 50.

After the ferrule 50 and hose 11 have been properly positioned on the stem, the ferrule is crimped onto the hose and stem by conventional means known by those of ordinary skill in the art. The crimping of the ferrule may result in slight deformation of the smooth circular configuration of the outer circumference of the ferrule. After crimping, the swivel nut 50 is secured onto the stem between the axially outer stem shoulder 39 and the ferrule 60. Following crimping, without a complete removal of the crimped-on ferrule 60, the swivel nut 50 cannot be removed from the stem 30.

Following crimping, gasoline fittings and nozzles may be attached to the swivel nut 50. The secure attachment of the swivel nut 50 permits a gasoline nozzle to rotate 360° around the hose without causing the hose to kink or tangle.

Additionally, the fitting 10 can be designed to install on all sizes of gasoline hose 11. The method of locking the swivel nut 50 onto the stem 30 without the use of a retaining ring 120 can also be used on many other types of known and conventional hoses.

The stem 30, swivel nut 50, and ferrule 60 of this fitting can be made out of various known and conventional materials either plated or unplated, such as brass, zinc, aluminum, and steel. The selection of the particular material for each piece being based upon the desired use of the assembly. In the preferred, the stem 30 is chrome plated brass, the swivel nut 50 is unplated zinc, and the ferrule 60 is unplated aluminum.

The inventive assembly 10 has several advantages over conventional crimped-on swivel fittings 100. The crimped-on swivel assembly 10 does not permit removal and reinstallation of the swivel nut 50, removing any safety concerns due to damage to conventional retaining rings 120. The crimped-on assembly 10 has better fitting retention than conventional crimped-on swivel fittings 100. The crimp-on assembly 10 also has higher coupling tensile and better flex life. The assembly 10 is also lower in cost and safer to assemble and use.

These and other objects, features and advantages of the present invention will be well appreciated upon reading of the preceding description of the invention when taken in conjunction with the attached drawings with understanding that some modifications, variations and changes could be easily done by the skilled person in the art to which the invention pertains without departing from the spirit of the invention or the scope of a claim appended hereto.

What is claimed is:

1. A method of securing a swivel fitting assembly 10 to a hose 11 end comprising the steps of:
   a) providing a swivel nut 50, a stem 30, and a ferrule 60, wherein
      the stem 30 is comprised of a groove 33 at a mid-length of the stem 30 and a shoulder 39 at a first axial end 31A,
      the swivel nut 50 is comprised of a series of threads 52, a set of wrench flats 53, and a shoulder 55 adjacent to the wrench flats 53 and at the opposing end fo the swivel nut 50 from the series of threads 52, and
      the ferrule 60 is comprised of an internally extending shoulder 63,
   b) inserting the stem 30 into the swivel nut 50,
   c) positioning the swivel nut 50 at the first axial end 31A of the stem 30 in a manner so the series of threads 52 of the swivel nut 50 abut directly against the shoulder 39 of the first axial end 31A of the stem 30 and the wrench flats 53 of the swivel nut 50 are positioned about the mid-length position of the stem 30 and the swivel nut 50 does not extend past the axial length of the stem 30,
   d) positioning the ferrule 60 over a terminal end of the hose 11,
   e) inserting a second axial end 31B of the stem 30 into the hose 11,
   f) aligning the internal shoulder 63 of the ferrule 60 over the groove 33 of the stem 30, and
   g) crimping the ferrule 60 onto the stem 30 to secure the ferrule 60 and hose 11 onto the stem 30, thereby setting the internal shoulder 63 in the groove 33 of the stem 30 and securing the swivel nut 50 onto the stem 30 between the shoulder 39 of a first axial end 31A of the stem 30 and the ferrule 60.

2. The method of securing a swivel fitting assembly 10 to a hose 11 end of claim 1 wherein the outer circumference 61 of the ferrule 60 is substantially cylindrical and the step of crimping the ferrule 60 does not substantially change the outer configuration of the ferrule 60.

3. The method of securing a swivel fitting assembly 10 to a hose 11 end of claim 1 wherein the second axial end 31B of the stem 30 is comprised of a series of barbs 35.

4. The method of securing a swivel fitting assembly 10 to a hose 11 end of claim 3 wherein the stem 30 has three to seven barbs 35.

5. The method of securing a swivel fitting assembly 10 to a hose 11 end of claim 1 further comprises the step of attaching a gasoline nozzle to the swivel nut 50 after the ferrule 60 has been crimped onto the hose 11.

6. A crimped swivel fitting assembly 10 for a liquid or gas hose 11 comprising a swivel nut 50, a stem 30, and a ferrule 60, wherein:
   the stem 30 is comprised of a groove 33 at a mid-length of the stem 30 and a shoulder 39 at a first axial end 31A,
   the swivel nut 50 is comprised of a series of threads 52, a set of wrench flats 53, and a shoulder 55 adjacent to the wrench flats 53 and at the opposing end of the swivel nut 50 from the series of threads 52, and
   the ferrule 60 is comprised of an internally extending shoulder 63, and in the assembly 10, a) the swivel nut 50 is positioned at the first axial end 31A of the stem 30 so that the series of threads 52 of the swivel nut 50 abut directly against the shoulder 39 of a first axial end 31A of the stem 30 and does not extend past the axial length of the stem 30, b) the wrench flats 53 of the swivel nut 50 are positioned about the mid-length position of the stem 30, and c) the ferrule 60 is crimped over a terminal end of the hose 11 with the internal shoulder 63 of the crimped ferrule 60 set in the groove 33 of the stem 30 thereby securing the swivel nut 50 onto the stem 30 between the shoulder 39 at the first axial end 31A of the stem 30 and the crimped ferrule 60.

7. The crimped swivel fitting assembly 10 of claim 6 wherein the crimped ferrule 60 has a substantially cylindrical configuration.

8. The crimped swivel fitting assembly 10 of claim 6 wherein the second axial end 31B of the stem 30 is comprised of a series of barbs 35.

9. The crimped swivel fitting assembly 10 of claim 8 wherein the stem 30 has three to seven barbs 35.

10. The crimped swivel fitting assembly 10 of claim 6 wherein a gasoline nozzle is attached to the swivel nut 50 after the ferrule 60 has been crimped onto the hose 11.

* * * * *